US012768444B2

(12) United States Patent
Pellmann et al.

(10) Patent No.: US 12,768,444 B2
(45) **Date of Patent: *Oct. 20, 2026**

(54) SYSTEMS AND METHODS FOR A ROTARY DISCONNECT

(71) Applicant: HUSCO Automotive Holdings LLC, Waukesha, WI (US)

(72) Inventors: Matthew Pellmann, Summit, WI (US); Brian Heidemann, Lake Mills, WI (US); Trevor Wynkoop, Milwaukee, WI (US); Matthew Koehler, Burlington, WI (US); Bradley Bauer, Oconomowoc, WI (US)

(73) Assignee: HUSCO AUTOMOTIVE HOLDINGS LLC, Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,216

(22) Filed: Jul. 11, 2025

(65) Prior Publication Data

US 2025/0341252 A1 Nov. 6, 2025

Related U.S. Application Data

(63) Continuation of application No. 17/825,699, filed on May 26, 2022, now Pat. No. 12,359,721.

(60) Provisional application No. 63/318,377, filed on Mar. 9, 2022, provisional application No. 63/193,411, filed on May 26, 2021.

(51) Int. Cl.

*F16H 63/30* (2006.01)
*F16H 63/32* (2006.01)

(52) U.S. Cl.

CPC ......... *F16H 63/3043* (2013.01); *F16H 63/32* (2013.01); *F16H 2063/305* (2013.01); *F16H 2063/321* (2013.01)

(58) Field of Classification Search

CPC ................. F16H 63/3043; F16H 63/32; F16H 2063/305; F16H 2063/321

See application file for complete search history.

(56) References Cited

U.S. PATENT DOCUMENTS

| | | | | |
|---|---|---|---|---|
| 11,390,160 | B2 * | 7/2022 | McBride ............ | B60K 17/3515 |
| 11,697,344 | B2 * | 7/2023 | Bird ..................... | B60K 17/356 180/245 |
| 12,359,721 | B2 * | 7/2025 | Pellmann ................ | F16H 63/32 |

* cited by examiner

*Primary Examiner* — Victor L MacArthur

(74) *Attorney, Agent, or Firm* — Quarles & Brady LLP

(57) ABSTRACT

A disconnect system for selectively coupling or disconnecting a drive member and a driven member via a clutch ring. The disconnect system includes a solenoid actuator and a linkage configured to move the clutch ring. The linkage is moved by the solenoid between an engaged configuration where the linkage is configured to rotationally couple the clutch ring to the driven member and a disengaged position where the linkage is configured to rotationally decouple the clutch ring from the driven member. A housing receives the solenoid actuator and the linkage, and a cover is configured to couple to the housing. A position sensor that detects a first pin of the solenoid actuator is arranged within the cover.

20 Claims, 12 Drawing Sheets

SYSTEMS AND METHODS FOR A ROTARY DISCONNECT

CROSS-REFERENCES TO RELATED APPLICATIONS

The present application is a continuation of U.S. patent application Ser. No. 17/825,699, filed on May 26, 2022, which claims priority to U.S. Provisional Patent Application No. 63/193,411, filed on May 26, 2021, and U.S. Provisional Patent Application No. 63/318,377, filed on Mar. 9, 2022, all of which are incorporated herein by reference in their entirety.

STATEMENT REGARDING FEDERALLY SPONSORED RESEARCH

Not Applicable.

BACKGROUND

In general, disconnects for automotive applications (e.g., vehicles with engines, motors, etc.) may be used to engage/disengage a driven member from a drivetrain/transmission of a vehicle.

BRIEF SUMMARY

In one aspect, the present disclosure provides a disconnect system for selectively coupling or disconnecting a drive member and a driven member via a clutch ring. The disconnect system includes a solenoid actuator and a linkage configured to move the clutch ring. The linkage is moved by the solenoid actuator between an engaged configuration where the linkage is configured to rotationally couple the clutch ring to the driven member, and disengaged configuration where the linkage is configured to rotationally decouple the clutch ring from the driven member. A housing receives the solenoid actuator and the linkage. A cover is configured to couple to the housing. A position sensor that detects a first pin of the solenoid actuator is arranged within the cover.

In one aspect, the present disclosure provides a disconnect system for selectively coupling or disconnecting a drive member and a driven member via a clutch ring. The disconnect system includes a housing, a cover configured to couple to the housing, an actuator arranged within the housing, a shift fork pivotally coupled to the housing and configured to move the clutch ring, and a position sensor arranged within the cover to detect a position of an actuated member of the actuator. The shift fork is pivoted by the actuator such that the clutch ring is translated between a disengaged position where the clutch ring is rotationally coupled to the drive member and an engaged position in which the clutch ring is rotationally coupled to the drive member and the driven member.

In one aspect, the present disclosure provides a disconnect system for selectively coupling or disconnecting a drive member and a driven member. The disconnect system includes a housing, a cover configured to couple to the housing and defining an open end and a closed end, an actuator arranged within the cover, and a shift fork. The shift fork is moved by the actuator between a first position corresponding the drive member being rotationally coupled to the driven member, and a second position corresponding to the drive member being rotationally decoupled from the driven member. A position sensor is positioned in the cover such that the actuator is arranged between the open end of the housing and the position sensor.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1A:
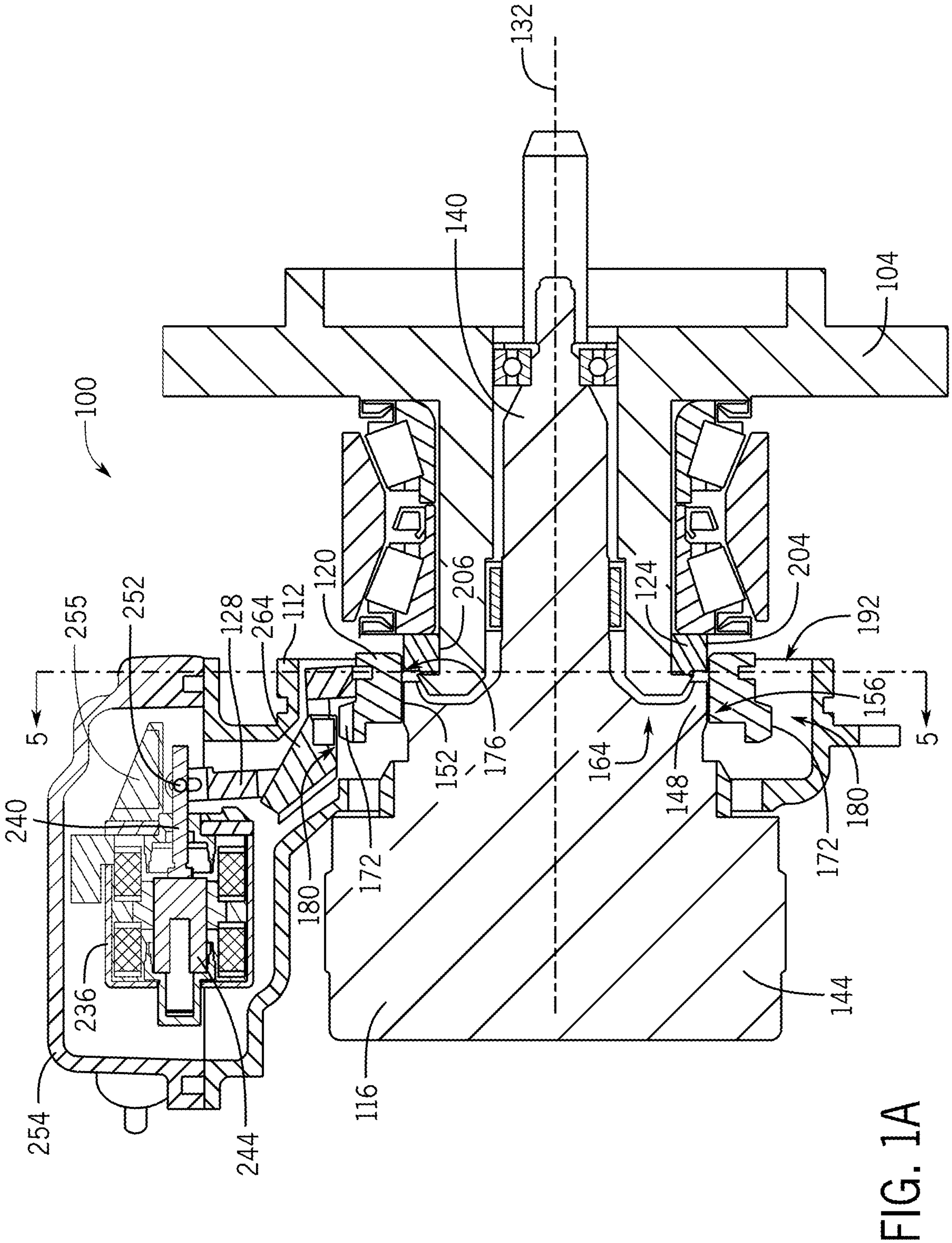
FIG. 1A is a cross-sectional view of a disconnect system with a clutch ring in an engaged position according to one aspect of the present disclosure.

The use herein of the term "axial" and variations thereof refers to a direction that extends generally along an axis of symmetry, a central axis, an axis of rotation, or an elongate direction of a particular component or system. For example, axially extending features of a component may be features that extend generally along a direction that is parallel to an axis of symmetry or an elongate direction of that component. Further, for example, axially aligned components may be configured so that their axes of rotation are aligned. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, an axis of rotation, a central axis, or an elongate direction of a particular component or system.

Generally, the present disclosure provides systems and methods for a rotary disconnect for selective coupling and disengaging of a drive member and a driven member. For example, non-limiting examples of the present disclosure may be implemented in vehicles to selectively disengage wheel hubs from a drivetrain/transmission. Non-limiting examples of the present disclosure may be particularly useful in electrically powered vehicles, but they may also be beneficial to vehicles with internal combustion engines. In some non-limiting examples, a disconnect system can include a clutch ring that is configured to selectively rotationally couple a drive member to a driven member for engaging all-wheel drive or four-wheel drive. The clutch ring may be selectively moved by an actuator (e.g., a solenoid). In some non-limiting examples, the actuator may be coupled to a shift member, e.g., a shift fork, that is pivotally coupled to a housing so that pivotal movement of the shift fork results in an axial translation of the clutch ring into and out of engagement with the driven member.

In some non-limiting examples, a disconnect system can include a clutch ring that is driven by a drive (e.g., a vehicle transmission/drivetrain). For example, the transmission may be rotationally coupled to a drive member (e.g., an axle member) by a drivetrain, and the drive member can be rotationally coupled to the clutch ring so that the clutch ring is operatively coupled to the transmission. In some non-limiting examples, a clutch ring can be a ring or gear that includes teeth that are configured to engage external teeth of the axle member so that the clutch ring is rotationally coupled to the transmission. Further, in some non-limiting examples, a clutch ring can be used to selectively rotationally couple a driven member (e.g., a wheel hub) to a transmission. For example, internal teeth of a clutch ring can be configured to selectively engage external teeth of a driven member (e.g., a wheel hub), in response to an outside force (e.g., from an actuator/solenoid) displacing the clutch ring. In this way, the clutch ring, and thereby the transmission, can be selectively coupled to the driven member via the clutch ring. Accordingly, when the clutch ring engages the driven member, the driven member can be rotationally driven by the drive member (e.g., an axle member that is coupled to a transmission).

Furthermore, in some non-limiting examples, a clutch ring can be movable by an actuator. For example, a solenoid can be operatively coupled to the clutch ring so that activation of the solenoid can result in movement of the clutch ring. In some non-limiting examples, a shift member can operatively couple the solenoid to the clutch ring. In this way, energizing the solenoid can induce axial translation of the clutch ring.

Systems and methods for a disconnect for selective coupling and disconnecting of a vehicle transmission to a wheel hub according to non-limiting examples of the present disclosure can be configured to disengage all-wheel drive of a vehicle in certain operating conditions. In some instances, operating conditions may relate to internal states of a vehicle, including operating parameters of an engine or battery, operational states of implements or other work elements, etc. In some instances, operating conditions may relate to external conditions, including environmental and terrain conditions. Further, in some instances, operating conditions may relate to speed of a vehicle, including rotational speed of one or more internal components of the vehicle.

Figure 6:
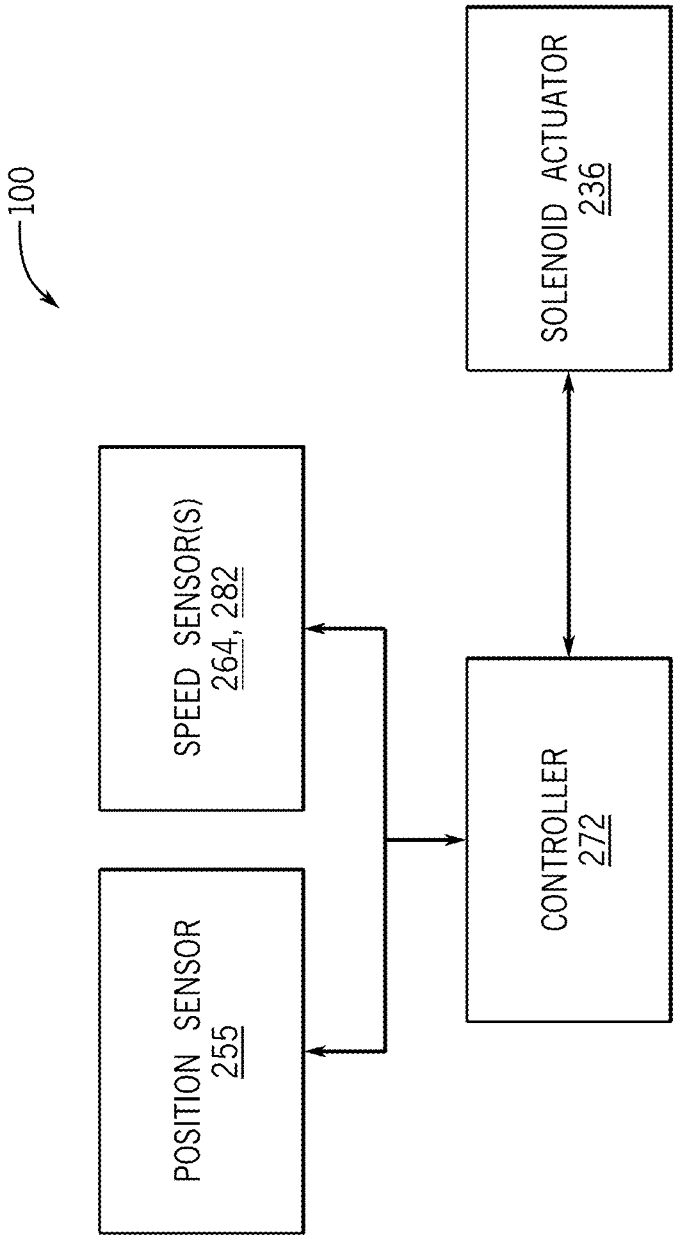
FIG. 6 is a schematic illustration of components of the disconnect system of FIG. 1A.

Generally, in some embodiments, indicators of any variety of operating conditions can be detected (e.g., by dedicated or general purpose sensors) and the indicators can be communicated to a controller (e.g., a general or special purpose processor having memory, see controller 272, FIG. 6). In some examples, the controller can form part of a control unit on a vehicle (e.g., a transmission control unit, and engine control unit, a motor controller, a differential controller, etc.). In other examples, the controller can be a special purpose controller internal or external to the disconnect system 100 and in communication with one or more vehicle control units. The controller can then control one or more disconnect systems to engage/disengage all-wheel drive in response to the relevant operating condition(s). For example, a vehicle may include one or more sensors that are configured to detect one or more operating conditions of one or more components of the vehicle components or of the area surrounding the vehicle (e.g., ring speed sensor 264, wheel speed sensor 282, and position sensor 255, FIGS. 1A, 6, and 8). A controller can cause one or more disconnect systems to selectively connect a driven member (e.g., a wheel hub) to a drive member (e.g., a vehicle transmission), as selected based on the detected operating condition(s). For example, one or more sensors may be provided to monitor/detect speed of one or more components of the vehicle. In some configurations, a sensor may be an encoder that is configured to calculate or detect a rotational speed of a component having external teeth. In some non-limiting examples, one or more sensors (e.g., encoders, Hall Effect sensors, or other speed sensors) can detect a rotational speed (e.g., rpm) of a clutch ring. In response to one or more detected operating conditions, a controller may control an actuator for selectively engaging/disengaging the disconnect system.

Figure 1B:
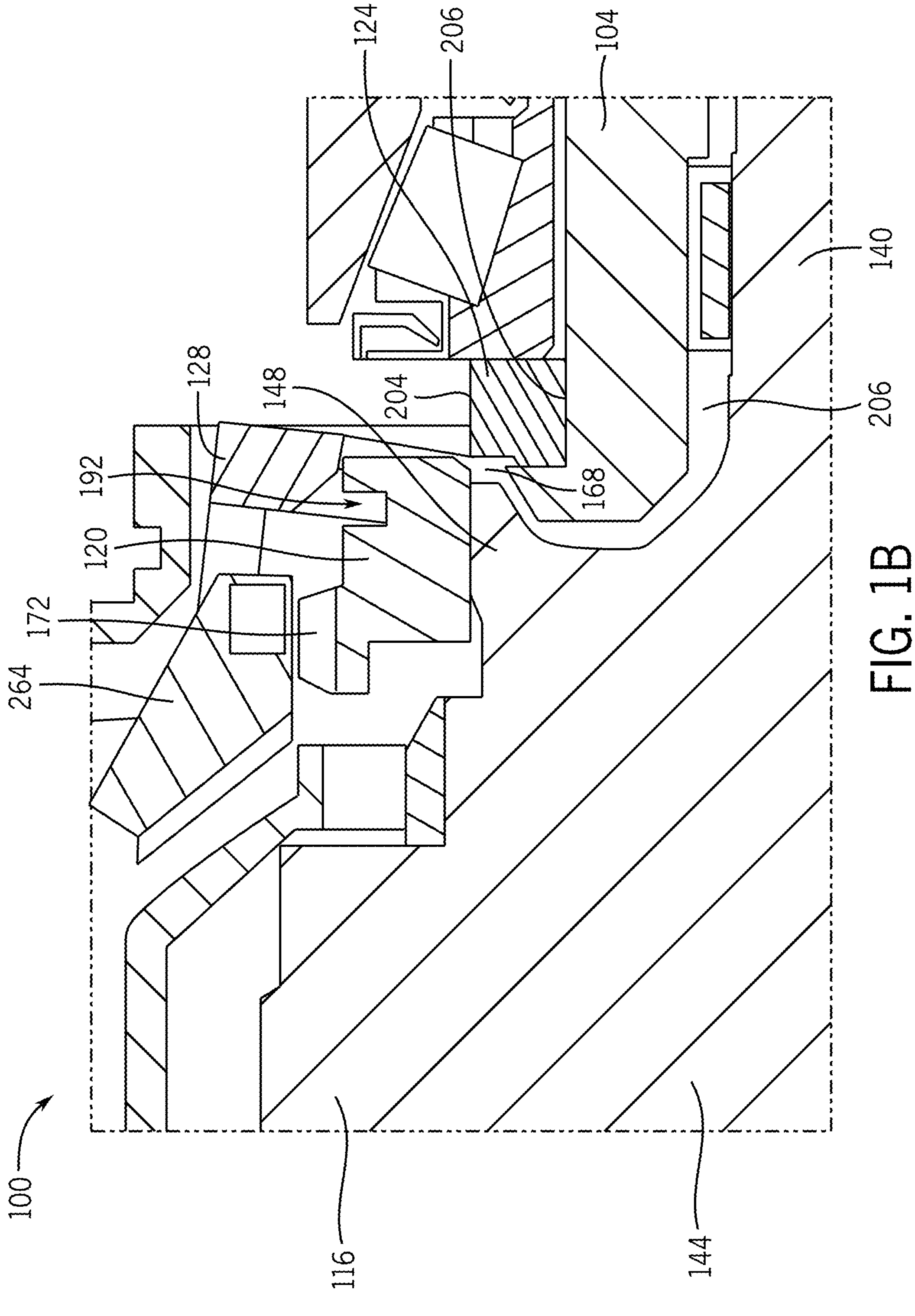
FIG. 1B is an enlarged view of a portion of the disconnect system of FIG. 1A with the clutch ring in a disengaged position.

FIGS. 1A and 1B illustrate one non-limiting example of a disconnect system 100 according to a non-limiting example of the present disclosure. The disconnect system 100 may be used in a vehicle to facilitate selective rotational communication between a transmission and a wheel hub. Some non-limiting examples of the present disclosure may be used to engage or disengage all-wheel drive or four-wheel drive of the vehicle within certain vehicle speed ranges. In some instances, the system may be configured to disengage all-wheel drive when conditions are detected that correspond to particular speeds. For example, a vehicle may disengage all-wheel drive when one or more components of a disconnect system rotate at a rotational speed of between about 350 revolutions per minute ("rpm") and about 1000 rpm (e.g., the vehicle's wheel speed). In some embodiments, a vehicle may disengage all-wheel drive when one or more components of a disconnect system rotate at a speed of between about 500 rpm and about 800 rpm.

The disconnect system 100 is illustrated with a driven member or wheel hub 104 of a vehicle that is configured to rotationally couple to a wheel (not shown). Particularly, the driven member 104 can be coupled to a wheel using known configurations (e.g., using a plurality of lug bolts or lug nuts). As discussed above, in some installations, disconnect systems according to examples of the present disclosure may be used with rear wheels of a vehicle, for example, to allow for selective engagement of the rear wheels for selective engagement or disengagement of all-wheel drive. In other installations, the disconnect systems may be used with the front wheels.

Figure 2:
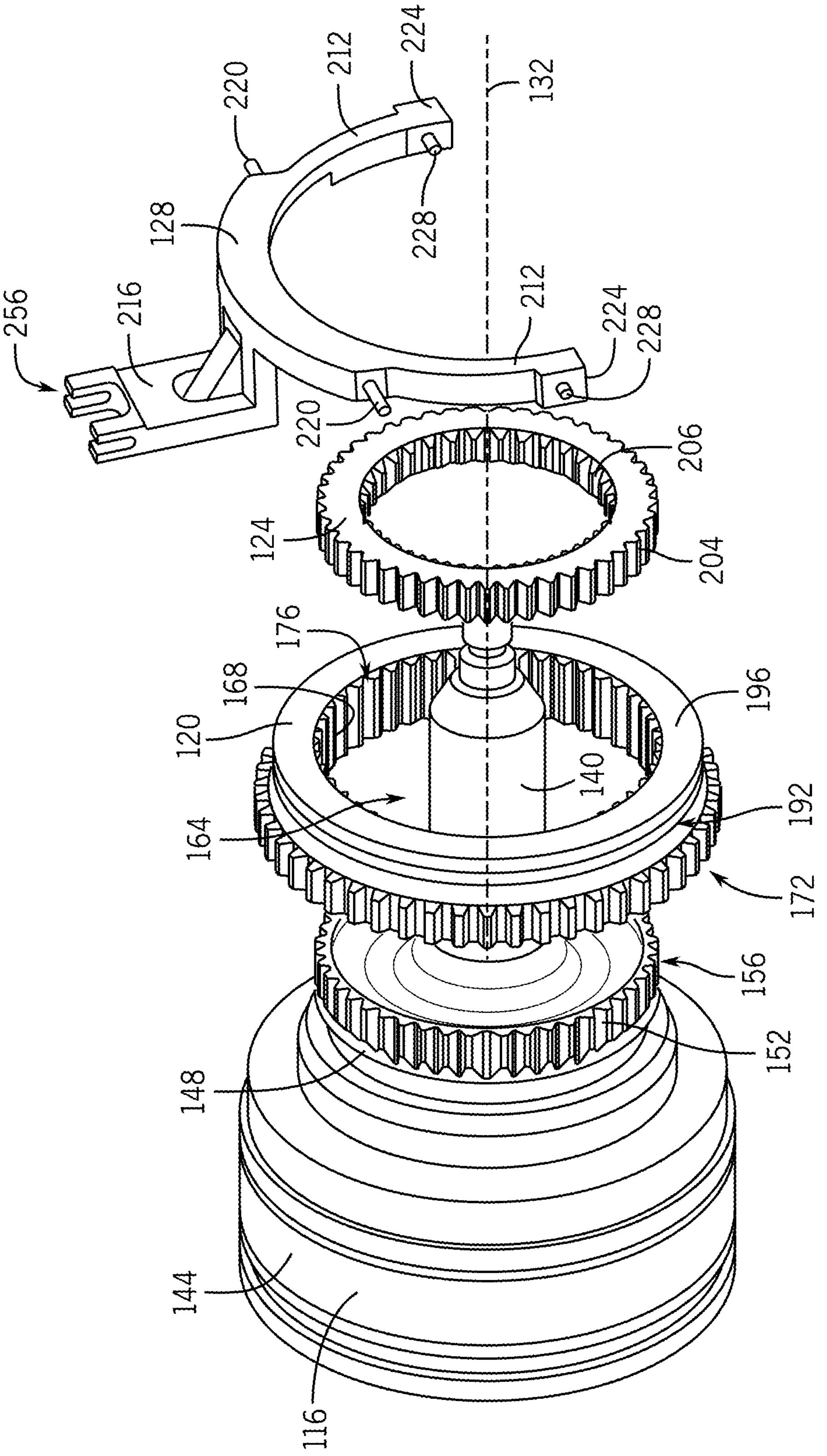
FIG. 2 is an exploded view of components included in or operable with the disconnect system of FIG. 1A.

As shown in FIGS. 1A, 1B, and 2, the disconnect system 100 includes a drive member or axle member 116, a clutch ring 120, a hub gear 124 formed on or coupled to the driven member 104, and a shift fork 128. Each of the drive member 116, the clutch ring 120, and the hub gear 124 may be axially aligned along, and concentrically disposed about, a rotational axis 132 (see also FIG. 1A). The clutch ring 120 may be at least partially arranged within a housing 112, and the drive member 116 may extend axially through the housing 112.

Figure 3:
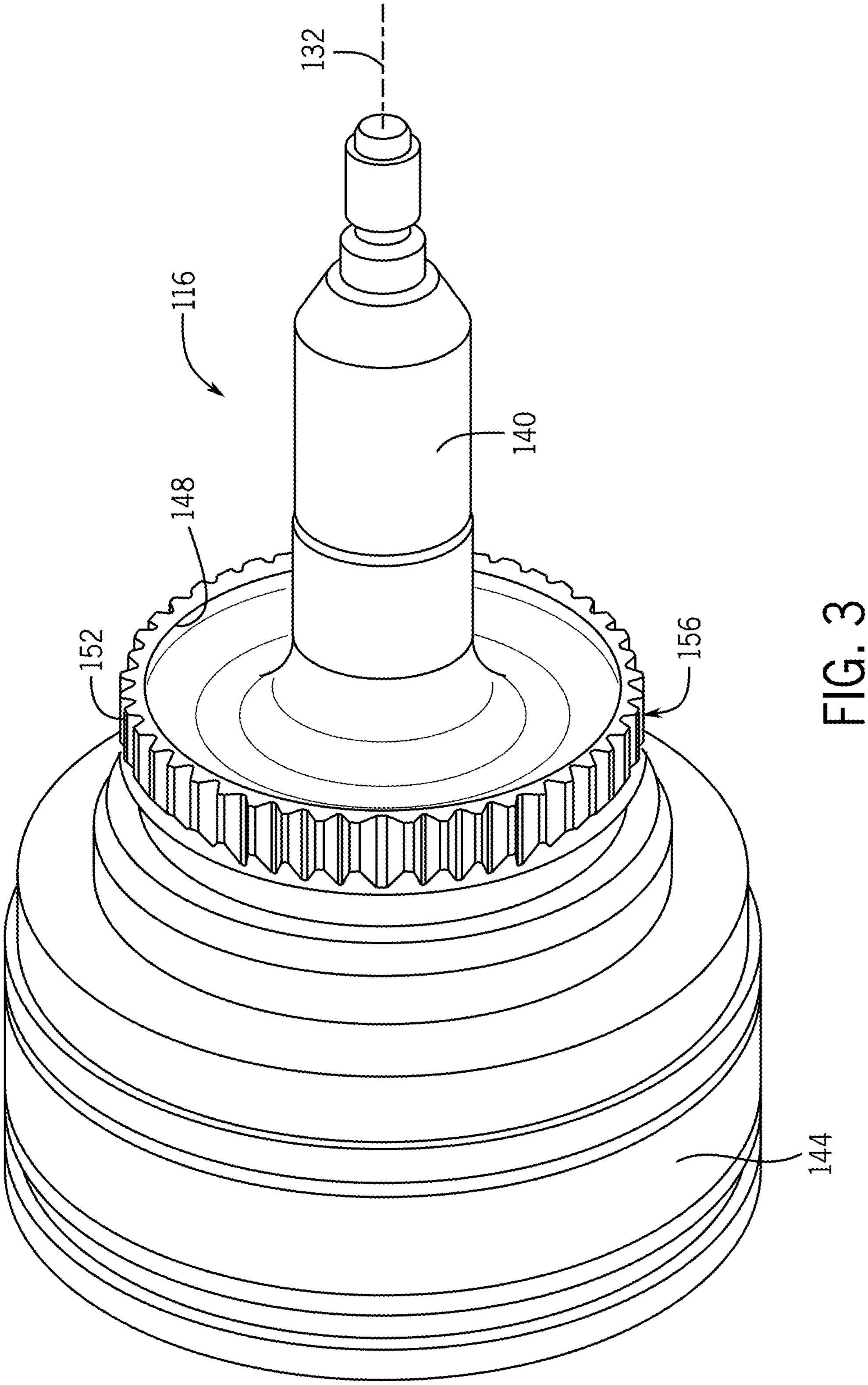
FIG. 3 is a perspective view of a shaft member of the disconnect system of FIG. 1A.

The drive member 116 is shown in detail in FIG. 3. The drive member 116 may alternatively be referred to herein as a half shaft or an axle member and is generally configured to be rotationally driven by a transmission (not shown) of a vehicle. In some installations, a transmission may be a transmission of an electric vehicle, but a transmission in other installations may be of a vehicle with an internal combustion engine or a hybrid vehicle. In some installations, the half shaft or axle member can be configured to be rotationally driven by an electric drive machine or electric drive unit including an electric motor, an inverter, and a gear reduction. The drive member 116 is configured to rotate with the transmission, which is driven by the vehicle's power source (e.g., an electric motor or an internal combustion engine). As shown, the drive member 116 is a unitary component that includes an elongate axle portion 140 extending from a base portion 144. The drive member 116 includes an intermediate portion 148 that is disposed between the base portion 144 and the elongate axle portion 140. A diameter of the intermediate portion 148 is between the diameter of the base portion 144 and the diameter of the elongate axle portion 140. In the illustrated non-limiting example, the intermediate portion 148 includes external gear teeth 152 on an external surface 156 thereof.

As shown in FIG. 2, the drive member 116 is configured to couple to the clutch ring 120 so that the clutch ring 120 of the disconnect system 100 according to the present non-limiting example is disposed between the base portion 144 of the drive member 116 and the driven member 104 (see FIG. 1A). The clutch ring 120 is generally provided to selectively couple and disconnect the drive member 116 and the driven member 104 (see, e.g., FIG. 1A), which will be described in greater detail below.

Figure 4:
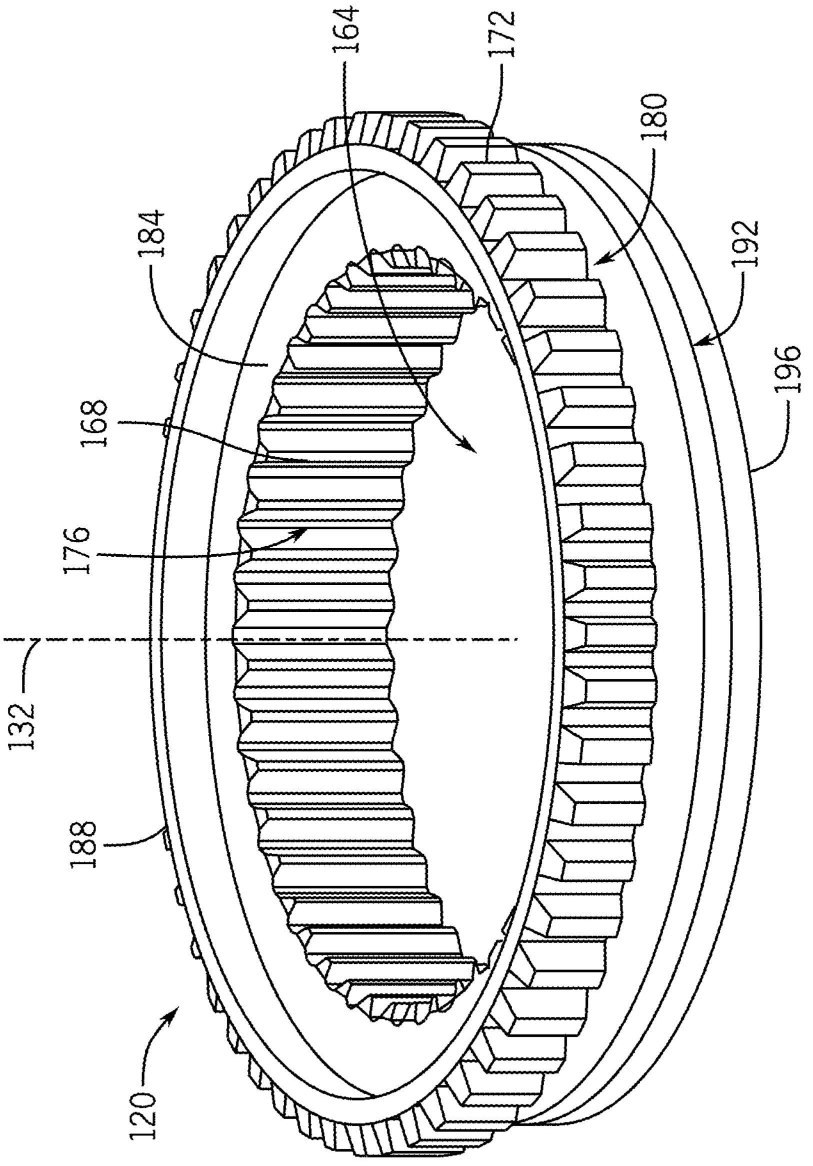
FIG. 4 is a perspective view of a clutch ring of the disconnect system of FIG. 1A.

FIG. 4 illustrates the clutch ring 120 in detail. As illustrated, the clutch ring 120 is an annular member that defines a central opening 164 and is geared having internal gear teeth 168 and external gear teeth 172. The internal teeth 168 are disposed circumferentially around an inner surface 176 of the clutch ring 120. The external teeth 172 are disposed circumferentially around an outer surface 180 of the clutch ring 120. The clutch ring 120 further includes an internal step 184 that is disposed between the inner surface 176 and a first end 188 of the clutch ring 120. Further, the clutch ring 120 defines a channel 192 that is radially recessed into and circumferentially extends along the clutch ring 120 proximate an opposing second end 196 of the clutch ring 120. More specifically, the external teeth 172 may not extend entirely along an axial length of the clutch ring 120. For example, in the present non-limiting example, the external teeth 172 are disposed proximate the first end 188 and the channel 192 is disposed proximate the second end 196.

Returning to FIG. 2, the internal teeth 168 of the clutch ring 120 are configured to mesh and engage with the external teeth 152 of the intermediate portion 148 of the drive member 116 to rotationally couple the clutch ring 120 to the drive member 116. The internal teeth 168 of the clutch ring 120 may be further configured to couple the drive member 116 to the driven member 104, upon selective axial translation of the clutch ring 120 (e.g., relative to the rotational axis 132). In the illustrated non-limiting example, for example, the internal teeth 168 of the clutch ring 120 are configured to mesh and engage with external teeth 204 of the hub gear 124, which is coupled to the driven member 104 for rotation therewith. In some non-limiting examples, the hub gear 124 may be integrally formed with the driven member 104.

As discussed above, the clutch ring 120 can be configured to selectively rotationally couple the drive member 116 to the driven member 104 to transition the disconnect system 100 between an engaged configuration with the clutch ring 120 in an engaged position and a disengaged configuration with the clutch ring 120 in a disengaged position. That is, the clutch ring 120 can be configured to move between an engaged position (FIG. 1A) and a disengaged position (FIG. 1B). The engaged configuration, for example, may provide four-wheel drive or all-wheel drive (for four-wheeled vehicles), whereas the disengaged configuration may provide two-wheel drive (e.g., front-wheel drive or rear-wheel drive).

The clutch ring 120 is rotationally coupled to the drive member 116, and when the clutch ring 120 is in the engaged position, the clutch ring 120 is rotationally coupled to the driven member 104. When the clutch ring 120 is in the disengaged position, the clutch ring 120 is disconnected from (e.g., rotationally decoupled from) the driven member 104. In the illustrated non-limiting example, as shown in FIG. 1A, axial translation of the clutch ring 120 in a first direction (e.g., towards the hub gear 124) engages the external teeth 204 of the hub gear 124 with the internal teeth 168 of the clutch ring 120, which is coupled to the drive member 116 through engagement with the external teeth 152. As such, rotation of the drive member 116, e.g., via the transmission, results in corresponding rotation of the driven member 104 through the rotational coupling provided by the clutch ring 120. In other words, in the engaged position, the clutch ring 120 is in an axial position where the internal teeth 168 of the clutch ring 120 are meshed and in engagement with both the external teeth 152 of the drive member 116 and the external teeth 204 of the hub gear 124, which is coupled to the wheel hub 104. In other words, the clutch ring 120 axially overlaps a portion of the external teeth of the drive member 116 and a portion of the external teeth 204 of the hub gear 124 of the wheel hub 104. This arrangement of the clutch ring 120 (e.g., the engaged configuration) rotationally couples the drive member 116 to the driven member 104.

In the disengaged configuration, as shown in FIG. 1B, the clutch ring 120 may be axially translated in a second direction (e.g., displaced away from the hub gear 124) so that the internal teeth 168 of the clutch ring 120 move out of engagement with the external teeth 204 of the hub gear 124. As such, in the disengaged configuration the clutch ring 120 decouples the drive member 116 from the hub gear 124, and thereby the driven member 104. Consequently, rotation of the drive member 116 induced by the transmission would not determine or control rotation of the driven member 104. In this configuration, the driven member 104 may be allowed to freely rotate independent of the rotation of the drive member 116 (e.g., rotation of the driven member 104 may be caused by contact between a road surface and a wheel coupled to the driven member 104).

Figure 5:
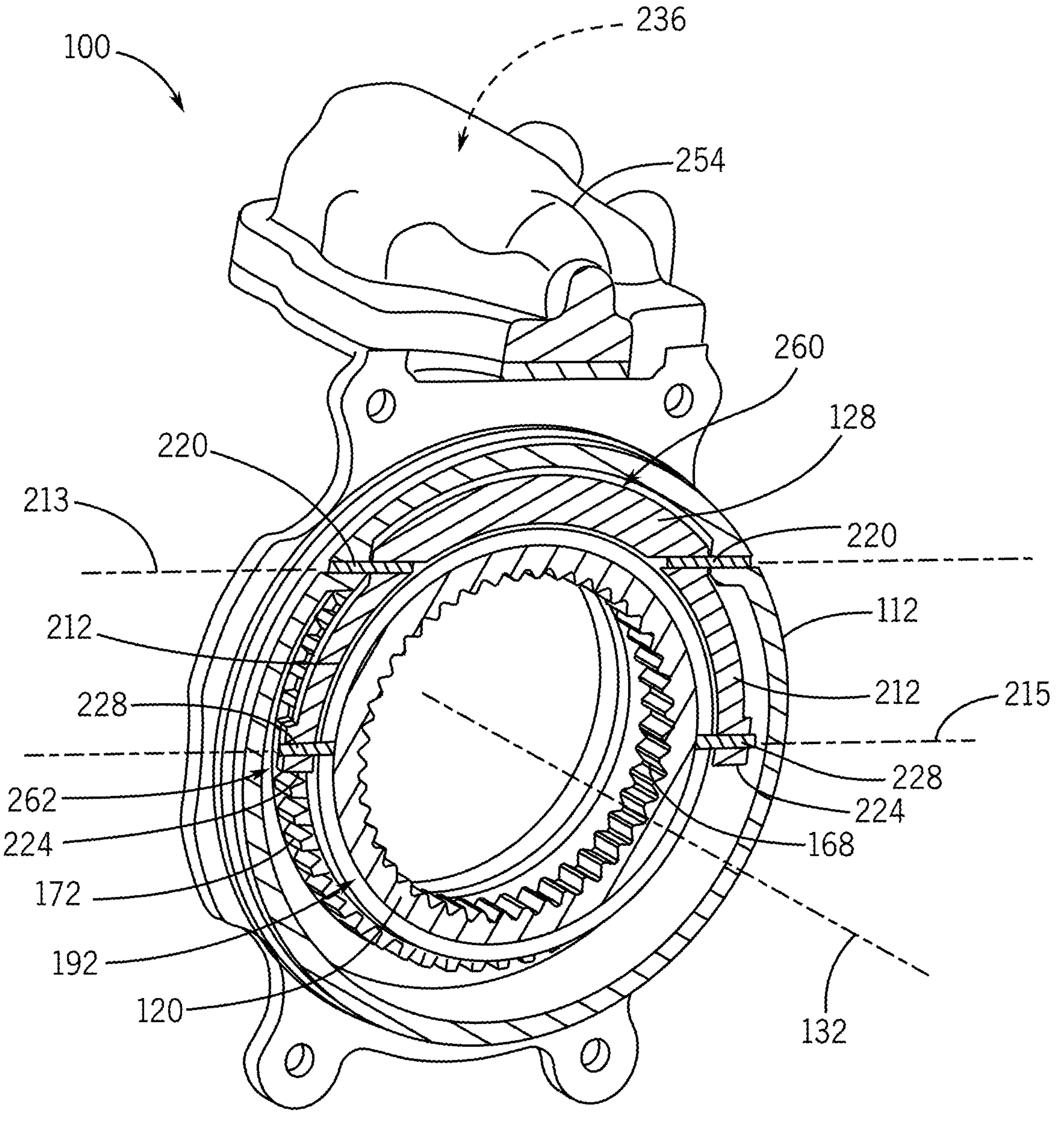
FIG. 5 is a cross-sectional view of the disconnect system of FIG. 1A taken along line 5-5.

In general, with reference to FIGS. 1A, 2, and 5, the shift fork 128 and an actuator or solenoid actuator 236 may control the selective movement (e.g., axial translation) of the clutch ring 120 between the engaged configuration (e.g., an engaged position) and the disengaged configuration (e.g., a disengaged position). For example, as shown in FIG. 2, the shift fork 128 includes two, opposing shift arms 212 that extend from a body 216 along a common curved path. The shift fork 128 may be at least partially arranged within the housing 112. The shift arms 212 are arranged radially outside of the clutch ring 120 (see FIG. 5). The clutch ring 120 (e.g., via the shift fork) is generally configured to be pivotally attached to a portion of the housing 112 via pins 220. The pins 220 may establish a fixed attachment point for the shift fork 128 to pivot about. The pins 220 define a first pivot axis 213 that is transverse to the rotational axis 132 (see FIG. 5), and the shift fork 128 pivots relative to the housing 112 about the first pivot axis 213. In the illustrated embodiment, the first pivot axis 213 is offset from the rotational axis 132 (e.g., radially offset from the perspective of the rotational axis 132), such that the first pivot axis 213 does not intersect with the rotational axis 132.

The shift fork 128 can be coupled to the clutch ring 120 at distal ends 224 of the shift arms 212 of the shift fork 128. For example, the channel 192 of the clutch ring 120, which extends substantially circumferentially along the clutch ring 120 about the rotational axis 132, can be configured to receive internal pins 228 extending radially inward and disposed proximate the distal ends 224 of the shift fork 128. The internal pins can define a second pivot axis 215 that is transverse to the rotational axis 132 (see FIG. 5) and radially offset from the first pivot axis 213 such that the first pivot axis is parallel to the second pivot axis 215. The second pivot axis 215 intersects with the rotational axis 132. The shift fork 128 pivots relative to the clutch ring 120 about the second pivot axis 215. Accordingly, pivotal movement of the shift fork 128 about the first pivot axis 213 can result in axial movement of the clutch ring 120 along the rotational axis 132 by engagement between the shift fork 128 and the clutch ring 120 at the second pivot axis 215.

Furthermore, non-limiting examples of the present disclosure can include an actuator for actuating/moving a shift fork for engaging and disengaging a clutch ring with a wheel hub. For example, as shown in FIG. 1A, the disconnect system 100 according to the present non-limiting example includes a solenoid actuator 236 that is configured to actuate, e.g., pivot, the shift fork 128 to axially translate the clutch ring 120 between engaged and disengaged positions. The solenoid actuator 236 is arranged within a housing cover 254 coupled to the housing 112. In some non-limiting examples, the solenoid actuator 236 may be a bi-stable solenoid having two stable operating positions (e.g., positions of an armature 244 that the solenoid actuator 236 may maintain without power being provided to the solenoid actuator 236). For example, the solenoid actuator 236 can move a pin 240 between an extended position and a retracted position. The solenoid actuator 236 includes the pin 240 that extends from an armature 244 of the solenoid actuator 236 that is configured to move with the armature 244 between the extended position and the retracted position via selective energization of the solenoid actuator 236. For example, a direction or polarity of a current supplied to the solenoid actuator 236 may determine the actuation configuration (e.g., extended position or retracted position) of the pin 240. In the illustrated non-limiting example, the solenoid actuator 236 can include one or more wire coils, a permanent magnet, one or more pole pieces, and in some examples, a spring in order to provide the bi-stable functionality.

In operation, a wire coil of the bi-stable solenoid actuator 236 may be selectively energized, i.e., supplied with a current in a desired direction at a predetermined magnitude. In response to the current being applied to the wire coil, the armature 244, and thereby the pin 240, can move between two stable positions (e.g., the retracted and extended positions) depending on the direction of the current applied to the wire coil. In some non-limiting examples, the armature 244 may be in a first armature position corresponding to the retracted position and the wire coil of the solenoid actuator 236 may be energized with a current in a first direction. The armature 244 may then fully shift (i.e., actuate) to a second armature position corresponding to the extended position and the wire coil may be de-energized (i.e., the current is removed). The armature 244 will remain in the second armature position until the wire coil is energized with a current in a second direction opposite to the first direction. The armature 244 may then fully shift back to the first armature position and the wire coil may be de-energized. In this way, the operation of the solenoid actuator 236 may require a reduced energy input because the wire coil is not required to be continuously energized.

The bi-stability of the solenoid actuator 236 allows the clutch ring 120 to be maintained in an engaged or a disengaged position without the need for power to be applied to the wire coil. That is, by maintaining a position of the shift fork 128 that is engageable by the solenoid actuator 236 via the pin 240, a position of the clutch ring 120 can be maintained. In other non-limiting examples, a mono-stable solenoid actuator could be utilized (e.g., a peak-and-hold solenoid), which would require constant power to maintain the clutch ring 120 in a desired position (e.g., an engaged position), but would return to a default state (e.g., a disengaged position) in the event of power loss.

In the illustrated non-limiting example, the disconnect system 100 can include a position sensor 255 configured to detect a position of the clutch ring 120. In the illustrated non-limiting example, the position sensor 255 may be arranged adjacent to the pin 240. The position sensor 255 is configured to detect a position of the pin 240 (see, e.g., FIG. 1A), which is in engagement with the shift fork 128 that axially translates the clutch ring 120. In other non-limiting examples, other pin detection systems can be used. For example, a current or voltage applied to the wire coil of the solenoid actuator 236 can be correlated to a position of the pin. As described herein, the position of the pin 240 may be directly correlated to a position of the shift fork 128 and, thereby, the position of the clutch ring 120. Accordingly, the position sensor 255 may be arranged to sense a configuration of the solenoid actuator 236 (e.g., a position of the pin 240) in either the extended configuration or the retracted configuration, which corresponds with sensing a position of the clutch ring 120 in either an engaged position or a disengaged position. Integrating the position sensor 255 into the disconnect system 100 enables the position of the clutch ring 120 to be actively detected and output, for example, to controller (see, e.g., controller 272, FIG. 6). Conventional disconnect systems often include a spring or another biasing element between the actuator input and the clutch ring. In these conventional configurations, the position of the actuator is not directly correlated to the position of the clutch ring, because of the intermediate spring, so sensing the position of the actuator only provides an output that is indicative of the state of the actuator, not the position of the clutch ring. The disconnect system 100 solves this problem by providing the position sensor 255 and utilizing an actuating linkage between the pin 240 and the clutch ring 120 (i.e., the shift fork 128) that results in direct movement of the clutch ring 120 upon movement of the pin 240.

The solenoid actuator 236 is coupled to the shift fork 128 so that the solenoid actuator 236 can control movement of the shift fork 128. For example, as shown in FIG. 1A, the pin 240 is coupled to the shift fork 128 via attachment points 252 that extend from the pin 240. In the illustrated example, the attachment points 252 can be configured as pins to be received by slots 256 (see, e.g., FIG. 2) defined by the body 216 of the shift fork 128. In other examples, the attachment point 252 can be configured as a clevis (FIG. 9) to engage a shaft spanning between the slots 256 (or a shaft formed as part of the body 216 of the shift fork 128). Accordingly, when assembled, movement of the pin 240 by the solenoid actuator 236 can result movement of the shift fork 128 at attachment points 252, resulting in pivotal movement of the shift fork 128 about the first pivot axis 213 (see FIG. 5). More specifically, referring to FIG. 5, when the solenoid actuator 236 actuates, a first end 260 of the shift fork 128, e.g., the body 216 (see, e.g., FIG. 2) moves in a first direction, thereby pivoting the shift fork 128 about the pins 220. Accordingly, as the first end 260 of the shift fork 128 moves in the first direction, a second end 262, e.g., the distal ends 224, move in a second direction about the pins 220, the second direction being opposite the first direction. Movement of the second end 262 of the shift fork 128 results in axial translation of the clutch ring 120, via the coupling between the shift fork 128 and the clutch ring 120 provided by the internal pins 228, between the engaged position and the disengaged position.

As discussed above, systems according to non-limiting examples of the present disclosure can be configured to engage and/or disengage all-wheel drive of a vehicle in response to particular operating conditions. Still referring to FIG. 1A, in the present non-limiting example, the disconnect system 100 further includes a ring speed sensor 264 configured to monitor speeds of components of the disconnect system 100. For example, the ring speed sensor 264 can be an encoder that is configured to monitor a rotational speed of the clutch ring 120, e.g., via the external teeth 172 of the clutch ring 120. The external teeth 172 are provided on the clutch ring 120 to enable the ring speed sensor 264 to detect the rotational speed of the clutch ring 120. In response to the detected rotational speed, the solenoid actuator 236 may activate or deactivate to engage or disengage, respectively, the clutch ring 120 from the driven member 104. The ring speed sensor 264 may be configured to monitor the rotational speed of the clutch ring 120 in both the engaged position and the disengaged position. Accordingly, the ring speed sensor 264 may be arranged so that it is substantially aligned with the clutch ring 120, or capable of detecting the external teeth 172, in both the engaged and disengaged positions. In addition, the ring speed sensor 264 is enclosed within the housing 112, which negates the need to an external sensor to be provided for speed detection.

In general, the integration of the external teeth 172 on the clutch ring 120 provide a compact solution that allows speed sensing and shifting to occur with a reduced packaging size. Conventional disconnect systems typically require additional, external components to enable speed detection, which increases cost and packaging size of the system. Further, in systems with an open differential, the speed of the electric motor driving the system cannot be used to control the disconnect because the half-shafts may be rotating at different speeds, so the integrated speed sensing provided by the present invention provides improved control capabilities.

FIG. 6 illustrates a schematic representation of components of the disconnect system 100 shown in FIGS. 1A and 2. As illustrated, the disconnect system 100 can include a controller 272 that is configured to send control signal to components of the disconnect system 100 in response to received signals. For example, the ring speed sensor 264 can send information to the controller 272 indicating one or more particular operating conditions, e.g., a rotational speed of the clutch ring 120, and thereby a rotational speed of the drive member 116. In response to the detected operating condition, the controller 272 actuates the solenoid actuator 236, which, in turn, can result in pivotal movement of the shift fork. Movement of the shift fork, accordingly, can result in engagement or disengagement of the drive member with the driven member. For example, the solenoid actuator 236 may be configured to selectively transition the clutch ring 120 between the engaged position and the disengaged position based on the rotational speed of the clutch ring 120 (e.g., the rotational speed of the drive member 116), which is sensed or detected by the ring speed sensor 264. The position sensor 255 can then communicate the position of the clutch ring 120 (e.g., by inferring position of the clutch ring 120 by detecting the position of the pin 240) to the controller 272.

Figure 7A:
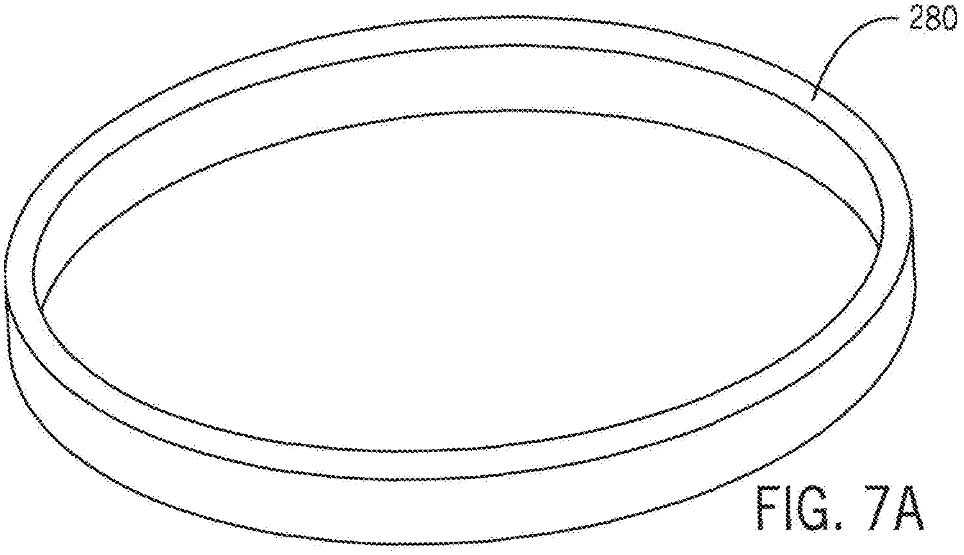
FIG. 7A is a perspective view of a bumper according to one aspect of the present disclosure.
Figure 7B:
FIG. 7B is a profile view of a bumper according to another aspect of the present disclosure.
Figure 8:
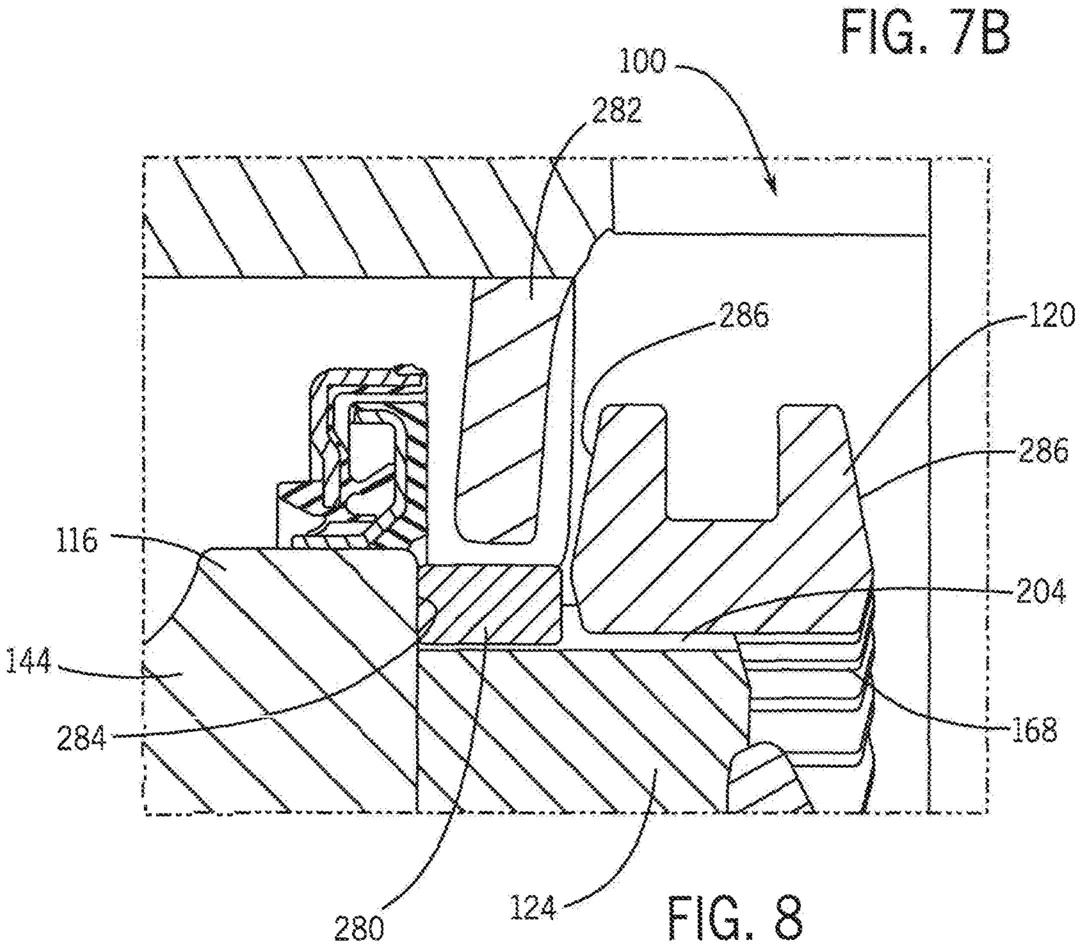
FIG. 8 is a partial cross-sectional view of the bumper of FIG. 7 integrated into the disconnect system of FIG. 1.

Turning to FIGS. 7A, 7B, and 8, in some non-limiting examples, the disconnect system 100 may interface with a wheel speed sensor 282 (see, e.g., FIG. 8). The wheel speed sensor 282 can be in communication with a controller (e.g., controller 272 of FIG. 6) to detect the rotational speed of a vehicle's wheels (e.g., an anti-lock brakes or "ABS" sensor). In some non-limiting examples, the controller can be configured to compare the speed of the vehicle's wheels detected by the wheel speed sensor 282 and the speed of the drive member 116 detected by the ring speed sensor 264 to determine if the speed differential therebetween is within a predetermined range (e.g., 10-100 rpm, 20-30 rpm, about 25 rpm, etc.). If the speed differential is within the predetermined range, then the controller 272 can allow the clutch ring 120 to be engaged/disengaged by the solenoid actuator 236.

In some non-limiting examples, the disconnect system 100 may include a bumper 280 to prevent or inhibit overtravel of the clutch ring 120 during actuation. The inclusion of the bumper 280 may further aid in preventing or inhibiting the clutch ring 120 from contacting the wheel speed sensor 282. The bumper 280 may be fabricated from a plastic material or a rubber material. For Example, the bumper 280 may be fabricated from a compliant material having a hardness on the Shore A or Shore D scales. For example, the material forming the bumper 280 can have a hardness between 0-100 Shore D. In some examples, the material forming the bumper 280 can have a hardness between 60 Shore A and 80 Shore D. In other examples, the material forming the bumper 280 can have a hardness between 40-55 Shore D. In some non-limiting examples, the bumper 280 can be fabricated from a non-metallic material. In some non-limiting examples, the bumper 280 may define an annular ring (e.g., FIG. 7A). In some examples, the bumper 280 can have planar surfaces. In some non-limiting examples, the bumper 280 may include a wave-like structure (e.g., FIG. 7B) or surfaces that engage the clutch ring 120 to add compliance or spring-like properties to the bumper 280, beyond those provided by the inherent material properties of the bumper 280.

In the illustrated non-limiting example, the bumper 280 may be arranged on the hub gear 124 axially between the clutch ring 120 and an end surface 284 on the base portion 144 of the drive member 116. In the illustrated example, the bumper 280 axially overlaps a portion of the axial width of the external teeth 204 of the hub gear 124. As the clutch ring 120 translates from the disengaged position to the engaged position, the bumper 280 can provide an end stop that aids in preventing the clutch ring 120 from overtravel, which can prevent the clutch ring 120 from contacting the wheel speed sensor 282. In addition, the bumper 280, particularly when formed from a soft, non-metallic material, can aid in reducing noises and vibrations that occur during actuation of the clutch ring 120.

As illustrated in FIG. 8, the clutch ring 120 can include a tapered surface 286 on a side of the clutch ring 120 facing the base portion 144 of the drive member 116. In the illustrated example, the clutch ring 120 includes tapered surfaces 286 on axially opposing side of the clutch ring 120. The tapered surface 286 defines a reduced axial width of the clutch ring 120 as the clutch ring 120 extends radially outward. The tapered surface(s) 286 are arranged such that the axial width of the clutch ring 120 narrows between the internal teeth 168 of the clutch ring and an exterior surface of the clutch ring 120. That is, the tapered surface(s) 286 are configured such that the axial width of the clutch ring 120 narrows in the radial direction from an inside portion to an outside portion. The tapered surface(s) 286 of the clutch ring 120 prevents contact between the clutch ring 120 and the wheel speed sensor 282. For example, the clutch ring 120 can pivotally tip (e.g., rotate counterclockwise from the perspective of FIG. 8) because the pivot point about the first pivot axis 213 (see FIG. 5) and the coupling point to the solenoid (e.g., attachment point 252) are axially offset. In that way, during the potential tipping of the clutch ring, the tapered surface(s) 286 can aid in preventing engagement between the clutch ring 120 and the wheel speed sensor 282.

Figure 9:
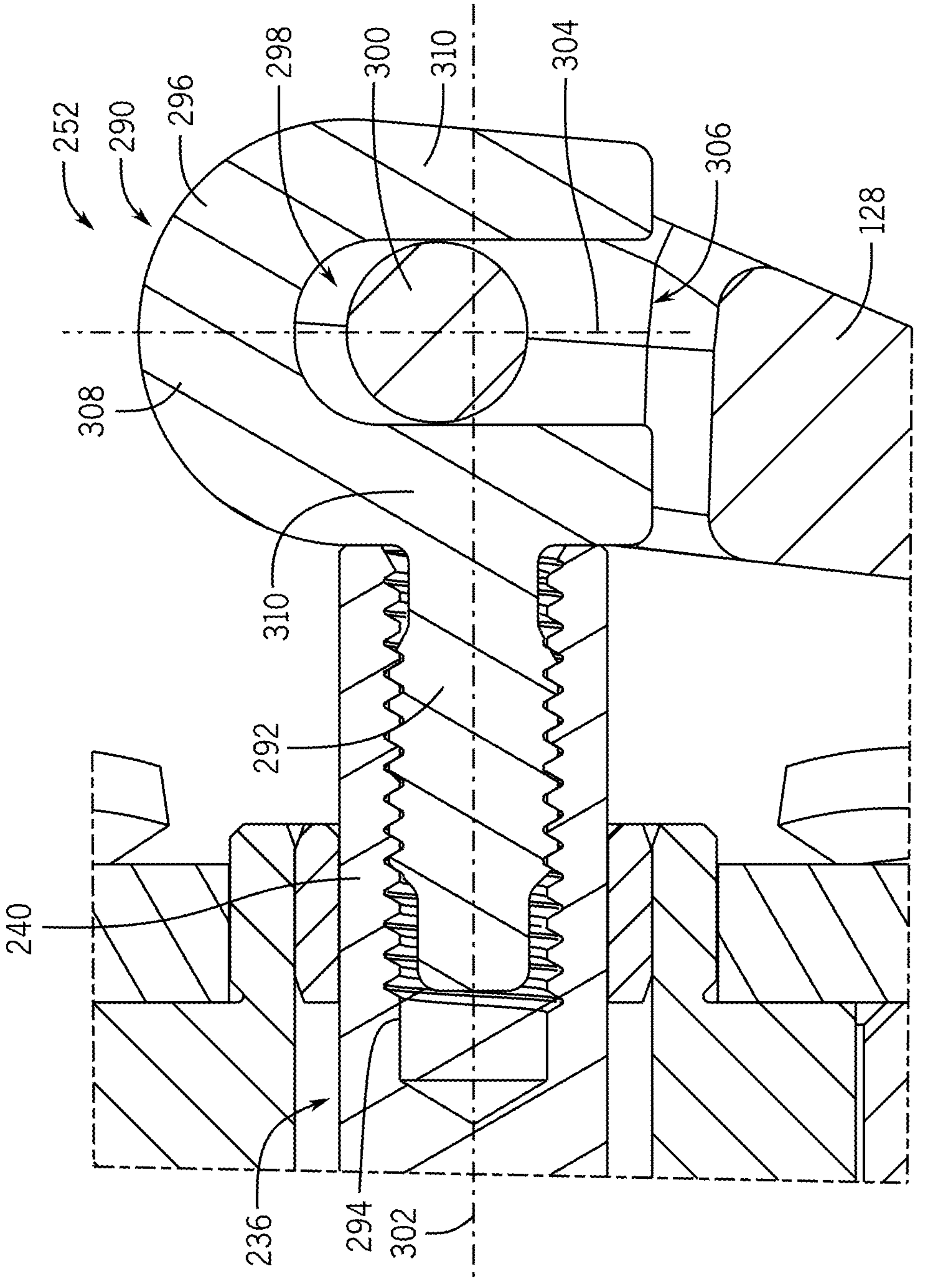
FIG. 9 is a partial cross-sectional view of a clevis coupled to an actuator.
Figure 10:
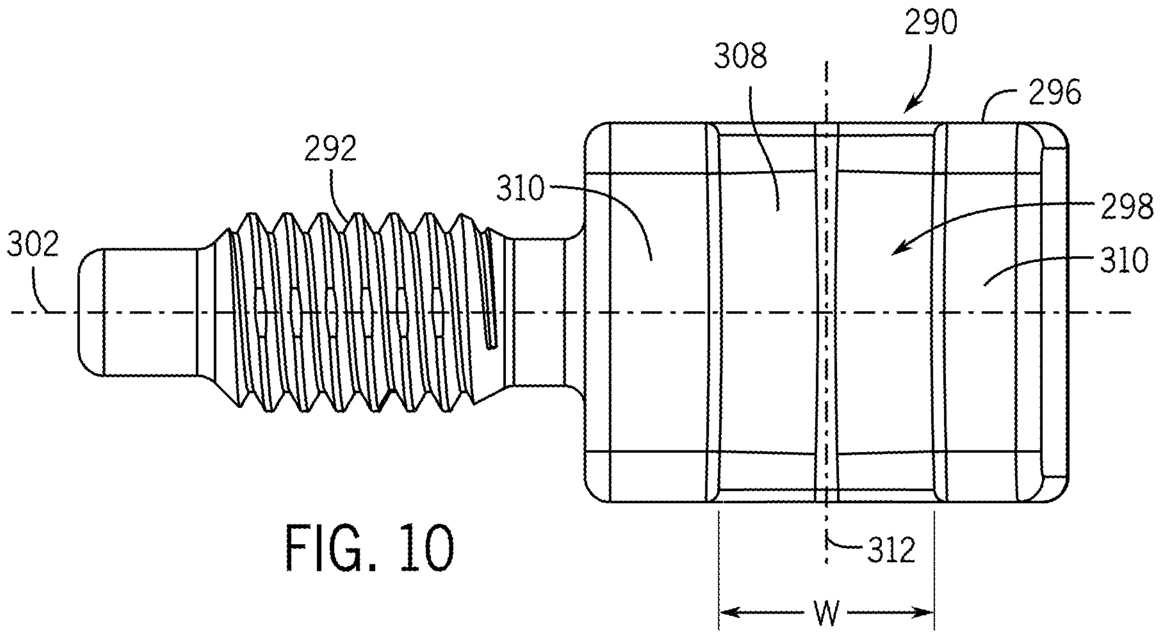
FIG. 10 is a bottom plan view of the clevis of FIG. 9.
Figure 11:
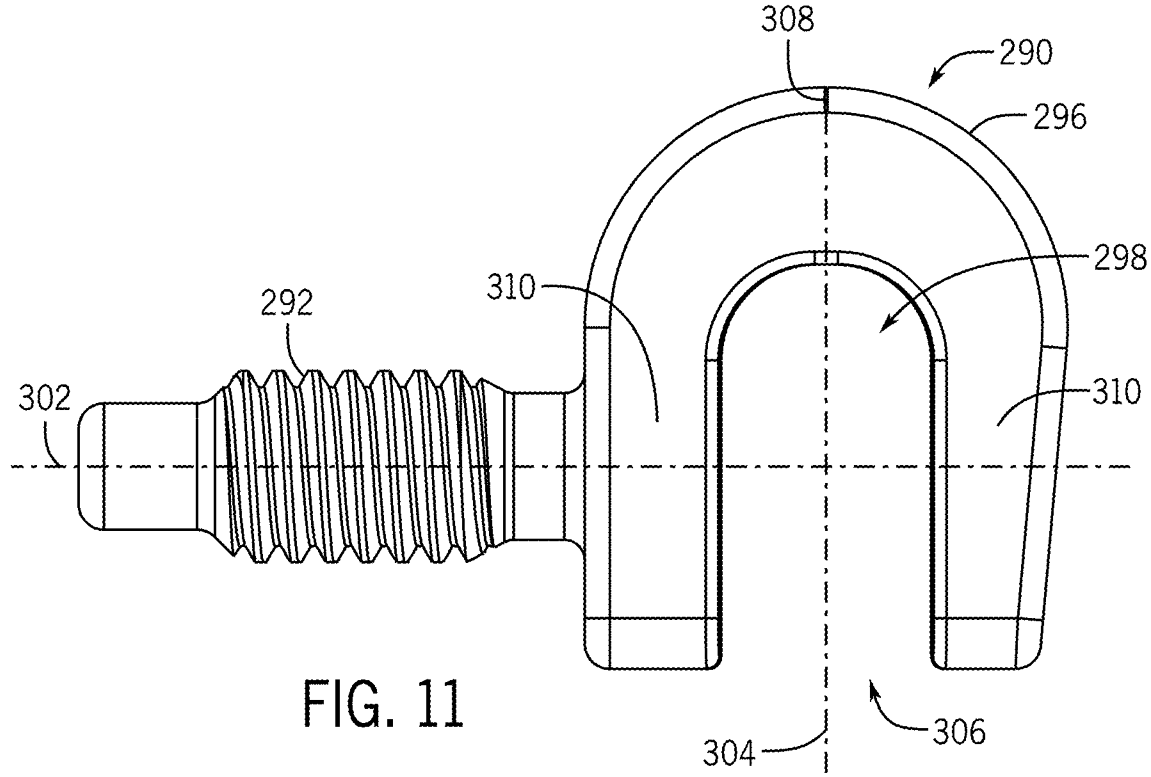
FIG. 11 is a profile view of the clevis of FIG. 9.

Referring now to FIGS. 9-11, in some examples, the disconnect system 100 can include a clevis 290 coupled between the solenoid actuator 236 and the shift fork 128 to provide the attachment point 252 between the solenoid actuator 236 and the shift fork 128 so that the solenoid actuator 236 can control movement of the shift fork 128. In the illustrated embodiment, the clevis 290 can include a clevis shaft 292 including external threads to be received within a recess 294 having internal threads at a distal end of the pin 240 of the solenoid actuator 236. In other embodiments, the clevis 290 can be coupled to the pin 240 welding, integral forming, or other threading arrangements. In some examples, the clevis 290 can be manufactured via metal injection molding. In some examples, the clevis 290 can be heat treated to improve wear resistance and strength characteristics.

The clevis 290 further includes a yoke 296 coupled to the clevis shaft 292. The yoke 296 can include a yoke recess 298 extending into the yoke 296 to receive a portion of the shift fork 128. In the illustrated example, the shift fork 128 includes an engagement shaft 300 spanning between the slots 256 (see FIG. 2) of the body 216 of the shift fork 128. In other examples, the engagement shaft 300 can be coupled to the body 216, or integrally formed as part of the body 216, of the shift fork 128. As previously described herein, the pin 240 of the solenoid actuator 236 can engage the shift fork 128, via the engagement between the clevis 290 and the engagement shaft 300, to control the axial position of the clutch ring 120. The yoke recess 298 can allow for a sliding motion between the engagement shaft 300 and the yoke 296 to accommodate, for example, vertical position errors and/or the pivoting motion of the shift fork 128.

In the illustrated example, the yoke 296 is arranged orthogonal to the pin 240 of the solenoid actuator 236. That is, the pin 240 can define a pin axis 302 along which the pin 240 translates. The yoke recess 298 can define a yoke axis 304 extending from an open end 306 of the yoke recess 298 to a base portion (e.g., a closed end) 308 of the yoke 296, such that the yoke axis 304 is transverse to the pin axis 302.

In the illustrated example, the yoke 296 is "U-shaped" including the base portion 308 and two leg portions 310 extending in generally similar directions from the base portion 308 to form the yoke recess 298. In some examples, the "U-shaped" yoke 296 can include leg portions 310 extending from opposite ends of the base portion 308 at substantially right angles to the base portion 308 (i.e., deviating from right angles by less than 5 degrees), with or without curved, chamfered, or otherwise non-square connecting regions between the leg portions 310 and the base portion 308. In the illustrated example, the "U-shaped" yoke 296 includes the leg portions 310 that extend as part of a continuous (e.g., non-angled) curve from either end of curved base portion 308.

Referring specifically to FIG. 10, the width W of the yoke recess 298 (e.g., a width of the yoke recess 298 relative to a transverse axis 312 that is orthogonal to the pin axis 302 and the yoke axis 304) can vary between opposing ends of the yoke 296. In the illustrated example, the width W of the yoke recess 298 varies such that the width is widest at the lateral most portion of the yoke recess 298 and is the most narrow at the center of the yoke recess 298 (e.g., relative to the transverse axis), thereby forming an "hourglass" shape. This "hourglass" shape allows for compensation of an angular offset between the shift fork 128 and the clevis 290, which may occur during operation The "hourglass" shape can also allow for angular offsets among components including the housing 112, the shift fork 128, the solenoid actuator 236, and the clevis 290, which can be inherent to an assembly of the components.

Figure 12:
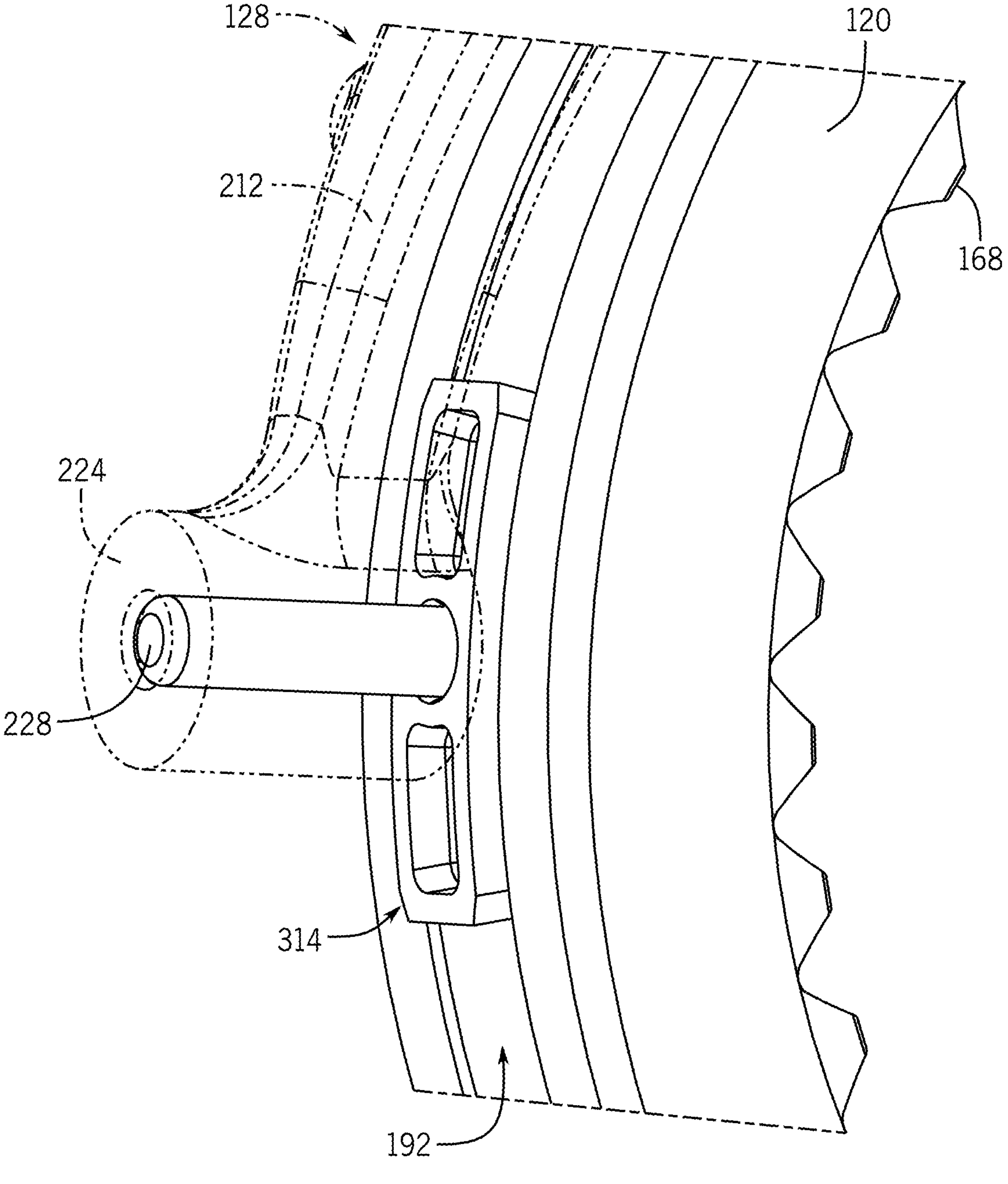
FIG. 12 is a perspective view of a shift pad arranged between a clutch ring and a shift fork.
Figure 13:
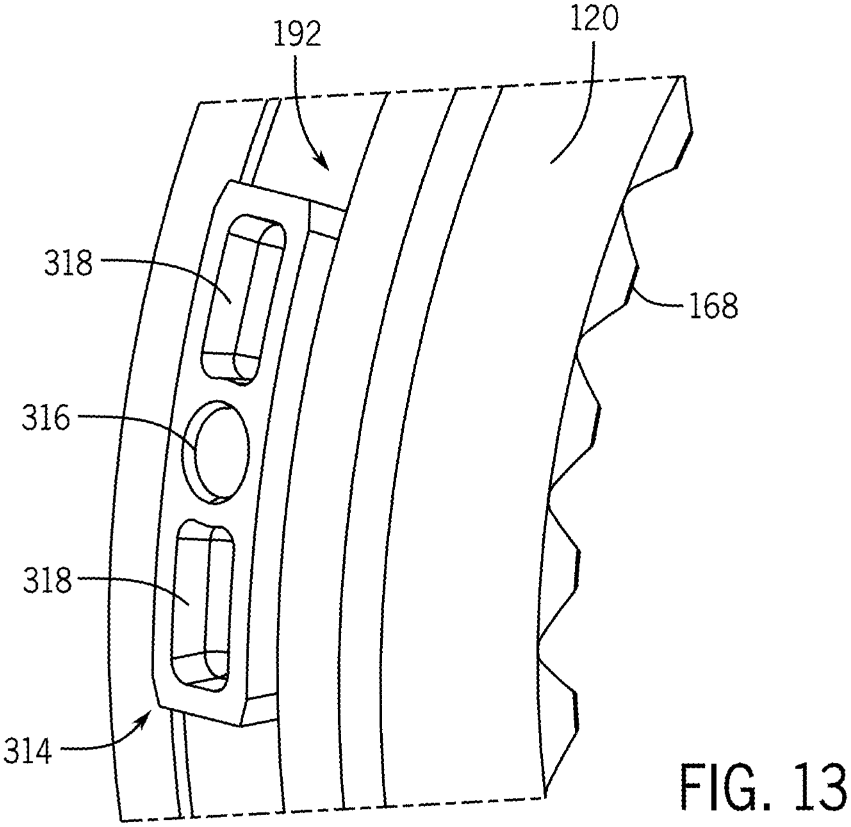
FIG. 13 is a perspective view of the shift pad of FIG. 12.
Figure 14:
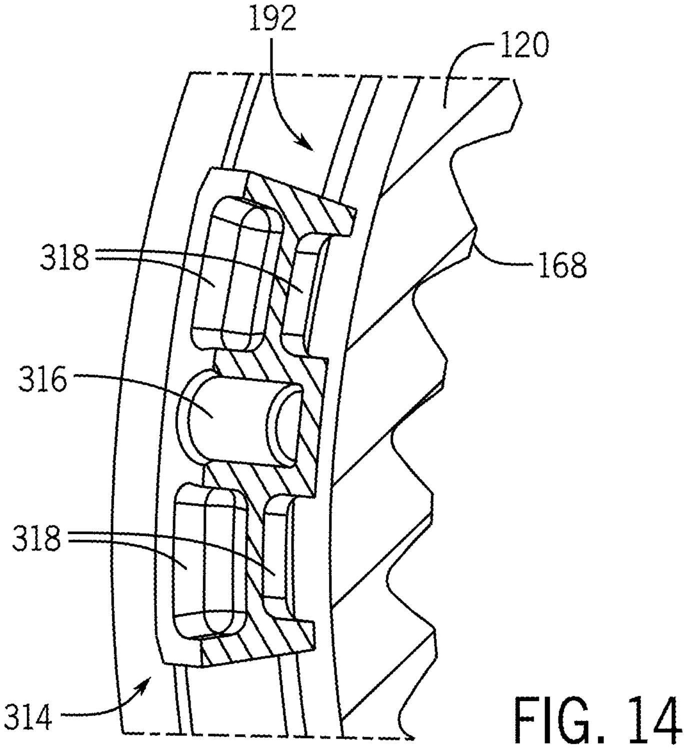
FIG. 14 is a partial cross-sectional view of the shift pad of FIG. 12.

Referring now to FIGS. 12-14, shift pads 314 can be coupled to each shift arm 212 of the shift fork 128 at the distal ends 224 thereof. The shift pads 314 can be coupled to the internal pins 228 extending from the shift arms 212 and received within the channel 192 extending circumferentially around the exterior of the clutch ring 120. The shift pads can provide wear resistance between the shift fork 128 and the clutch ring. That is, the clutch ring 120 rotates relative to the shift fork 128, and therefore wear can occur as the clutch ring rotates. In addition, wear can occur between the shift work and the clutch ring 120 as the shift fork 128 applies an axial load to shift the clutch ring 120. Therefore, shift pads 314 arranged between the shift fork 128 and the clutch ring 120 can reduce this wear. In some examples, the shift pads 314 can be formed from a wear resistant grade of plastic. In some examples, the shift pads 314 can be injection molded.

As best illustrated in FIGS. 13 and 14, the shift pad 314 can include a pin recess 316 extending radially inward to the shift pad 314 to receive the internal pin 228 from the shift fork 128 to allow pivotal movement between the shift fork 128 and the shift pad 314. As illustrated in FIG. 14, the shift pad 314 can define a generally arcuate shape that is complementary to the curvature of the clutch ring 120. The shift pad 314 can further include a plurality of pockets 318 extending radially inward from an exterior of the shift pad 314 and extending radially inward from an interior of the shift pad 314. The plurality of pockets 318 can reduce the mass of the shift pad. In the illustrated example, the pin recess 316 is arranged between at least two of the plurality of pockets 318.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A disconnect system for selectively coupling or disconnecting a drive member and a driven member via a clutch ring, the disconnect system comprising:

a solenoid actuator;

a linkage configured to move the clutch ring, the linkage moved by the solenoid actuator between an engaged configuration where the linkage is configured to rotationally couple the clutch ring to the driven member, and disengaged configuration where the linkage is configured to rotationally decouple the clutch ring from the driven member;

a housing that receives the solenoid actuator and the linkage;

a cover that is configured to couple to the housing; and a position sensor that detects a first pin of the solenoid actuator, the position sensor arranged within the cover.

2. The disconnect system of claim 1, wherein the linkage is configured as a shift fork that includes a first shaft and the first pin of the solenoid actuator includes a clevis defining a clevis recess that is configured to receive the first shaft of the shift fork.

3. The disconnect system of claim 2, wherein the shift fork defines a first slot and a second slot, and the first shaft extends between the first slot and the second slot.

4. The disconnect system of claim 2, wherein the clevis is coupled to a first end of the first pin and the position sensor is positioned to detect the first end of the first pin.

5. The disconnect system of claim 1, further comprising a shift pad that is pivotally coupled to the linkage, the shift pad configured to engage the clutch ring.

6. The disconnect system of claim 5, wherein the shift pad defines a pin recess and is pivotably coupled the linkage via a second pin that is received in the pin recess.

7. The disconnect system of claim 6, wherein the linkage is pivotally coupled to the housing via a third pin.

8. The disconnect system of claim 7, wherein the housing includes a housing recess through which the third pin extends to pivotally couple the linkage to the housing.

9. The disconnect system of claim 1, wherein the solenoid actuator is configured as a bi-stable solenoid actuator that is configured to maintain the linkage in each of the engaged configuration and the disengaged configuration in an unpowered state.

10. The disconnect system of claim 1, wherein the position sensor is disposed entirely within the cover.

11. A disconnect system for selectively coupling or disconnecting a drive member and a driven member via a clutch ring, the disconnect system comprising:

a housing;

a cover configured to couple to the housing;

an actuator arranged within the housing;

a shift fork pivotally coupled to the housing and configured to move the clutch ring, the shift fork pivoted by the actuator such that the clutch ring is translated between a disengaged position where the clutch ring is rotationally coupled to the drive member and an engaged position in which the clutch ring is rotationally coupled to the drive member and the driven member; and a position sensor arranged within the cover to detect a position of an actuated member of the actuator.

12. The disconnect system of claim 11 further comprising a controller that is configured to operate the actuator to pivot the shift fork based on a first signal corresponding to an operating condition of the disconnect system.

13. The disconnect system of claim 12 further comprising a first speed sensor that is configured to detect a first rotational speed of a first rotating component of the disconnect system, the operating condition including the first rotational speed.

14. The disconnect system of claim 13, wherein the first rotating component includes at least one of the clutch ring and the drive member.

15. The disconnect system of claim 12 further comprising a second speed sensor that is configured to detect a second rotational speed of a second rotating component of the disconnect system, the operating condition including the second rotational speed.

16. The disconnect system of claim 15, wherein the second rotating component includes at least one of a wheel and the driven member.

17. A disconnect system for selectively coupling or disconnecting a drive member and a driven member, the disconnect system comprising:

a housing;

a cover configured to couple to the housing, the cover defining an open end and a closed end;

an actuator positioned in the cover;

a shift fork that is moved by the actuator between a first position corresponding the drive member being rotationally coupled to the driven member, and a second position corresponding to the drive member being rotationally decoupled from the driven member; and a position sensor positioned in the cover such that the actuator is arranged between the open end of the housing and the position sensor.

18. The disconnect system of claim 17, wherein the actuator includes a body and an actuated member that extends from the body, the position sensor arranged to detect a position of the actuated member.

19. The disconnect system of claim 18, wherein the actuator is a solenoid and the actuated member is pin, the position sensor configured to detect an end of the pin that extends from the body of the solenoid.

20. The disconnect system of claim 17, wherein the shift fork is configured to pivot relative to the housing between the first position and the second position.

* * * * *